(12) United States Patent
Hall et al.

(10) Patent No.: US 7,080,998 B2
(45) Date of Patent: Jul. 25, 2006

(54) INTERNAL COAXIAL CABLE SEAL SYSTEM

(75) Inventors: David R. Hall, Provo, UT (US);
Cameron Sneddon, Provo, UT (US);
Scott Steven Dahlgren, Alpine, UT (US);
Michael A. Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 67 days.

(21) Appl. No.: 10/904,347

(22) Filed: Nov. 5, 2004

(65) Prior Publication Data

US 2005/0070144 A1    Mar. 31, 2005

Related U.S. Application Data

(63) Continuation-in-part of application No. 10/640,956, filed on Aug. 14, 2003, now Pat. No. 6,821,147, which is a continuation-in-part of application No. 10/358,099, filed on Feb. 2, 2003, now Pat. No. 6,844,498.

(60) Provisional application No. 60/444,100, filed on Jan. 31, 2003.

(51) Int. Cl.
*H01R 4/64* (2006.01)

(52) U.S. Cl. ............... 439/191; 166/65.1; 175/320

(58) Field of Classification Search .......... 439/181, 439/191, 194, 581; 166/65.1; 175/320; 340/853.1
See application file for complete search history.

(56) References Cited

U.S. PATENT DOCUMENTS

| | | | | |
|---|---|---|---|---|
| 4,126,848 A | * | 11/1978 | Denison | 340/855.1 |
| 4,627,490 A | * | 12/1986 | Moore | 166/65.1 |
| 4,759,406 A | * | 7/1988 | Smith et al. | 166/65.1 |
| 5,661,402 A | * | 8/1997 | Chesnutt et al. | 324/338 |
| 5,667,009 A | * | 9/1997 | Moore | 166/65.1 |
| 5,927,402 A | * | 7/1999 | Benson et al. | 166/65.1 |

* cited by examiner

*Primary Examiner*—Michael C. Zarroli
(74) *Attorney, Agent, or Firm*—Cameron Sneddon; Tyson J. Wilde

(57) ABSTRACT

The invention is a seal system for a coaxial cable and is placed within the coaxial cable and its constituent components. A series of seal stacks including load ring components and elastomeric rings are placed on load bearing members within the coaxial cable sealing the annular space between the coaxial cable and an electrical contact passing there through. The coaxial cable is disposed within drilling components to transmit electrical signals between drilling components within a drill string. The seal system can be used in a variety of downhole components, such as sections of pipe in a drill string, drill collars, heavy weight drill pipe, and jars.

64 Claims, 12 Drawing Sheets

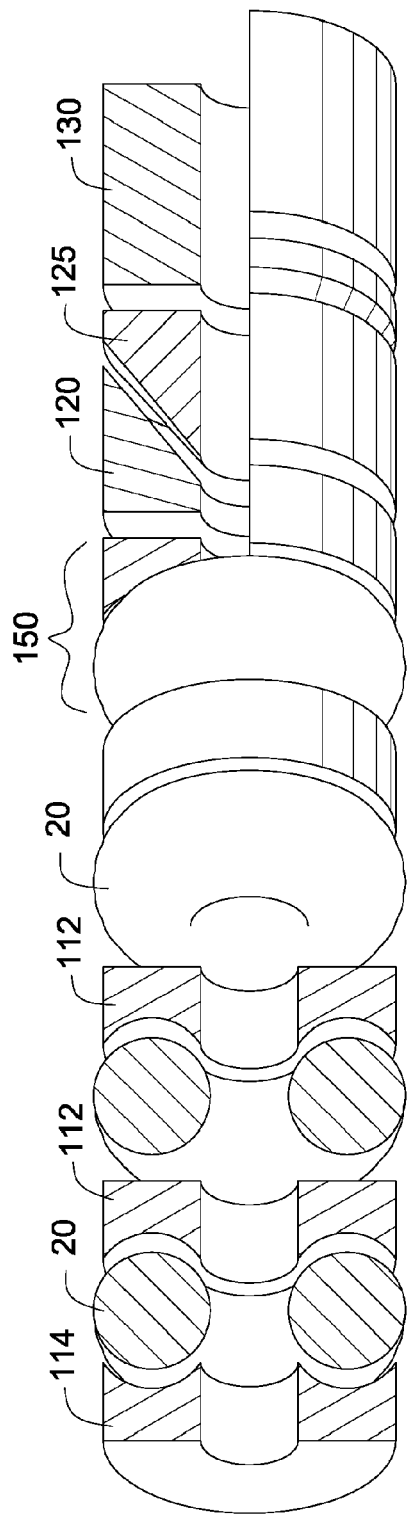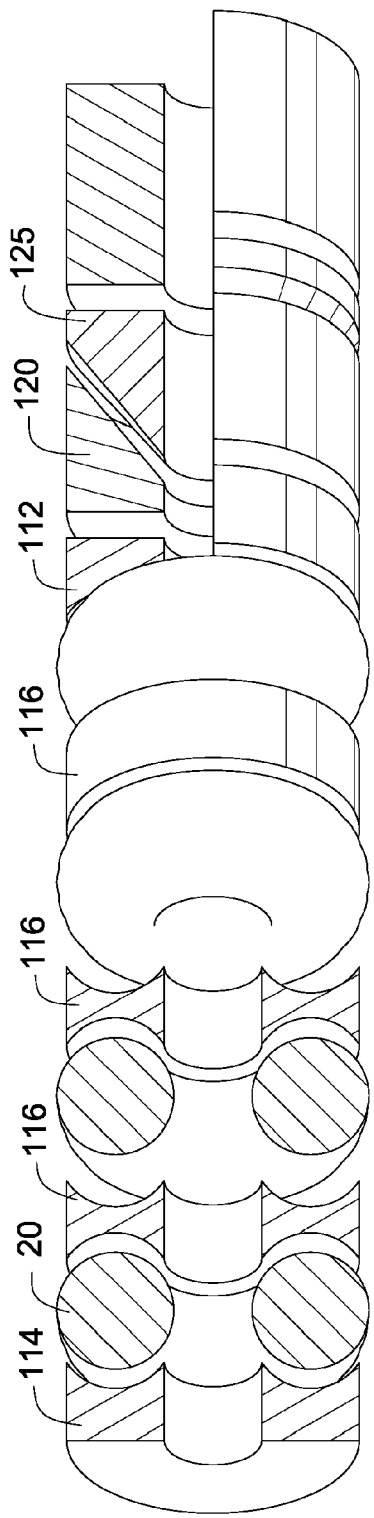

INTERNAL COAXIAL CABLE SEAL SYSTEM

CROSS-REFERENCE TO RELATED APPLICATIONS

The present application is a continuation-in-part of U.S. patent application Ser. No. 10/640,956 filed on Aug. 14, 2003 now U.S. Pat. No. 6,821,147 which is a continuation-in-part of U.S. patent application Ser. No. 10/358,099 filed on Feb. 2, 2003, now U.S. Pat. No. 6,844,498 which application in turn claims the benefit of the filing date of Provisional U.S. Patent Application Ser. No. 60/444,100 filed Jan. 31, 2003. The entire disclosures of all of these related applications are incorporated herein by reference.

FEDERAL RESEARCH STATEMENT

This invention was made with government support under contract No. DE-FC26-01 NT41229 awarded by the Department of Energy. The government has certain rights in this invention.

BACKGROUND OF THE INVENTION

The present invention relates to the field of sealing systems, particularly internal seal systems for coaxial cables. The preferred seal systems are particularly well suited for use in difficult environments wherein it is desirable to seal inside a coaxial cable without the normal means available such as O-rings in machined grooves, metal o-rings, or a split metallic ring. One such application is in data transmission systems for downhole environments, such as along a drill string used in oil and gas exploration or along the casings and other equipment used in oil and gas production.

The goal of accessing data from a drill string has been expressed for more than half a century. As exploration and drilling technology has improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data. One such system is disclosed in co-pending U.S. application Ser. No. 09/909,469, now U.S. Pat. No. 6,717,501 which is commonly assigned with the present invention and also incorporated herein by reference herein. Another such system is disclosed in co-pending U.S. application Ser. No. 10/358,099 the title of which is DATA TRANSMISSON SYSTEM FOR A DOWNHOLE COMPONENT file on Feb. 3, 2003. The disclosure of this U.S. application Ser. No. 10/358,099 is herein incorporated by reference.

Downhole data transmission systems use seals to protect the electrical transmission line from the drilling environment such as the system described above. Drilling fluids such as drilling mud are pumped down the center of a drilling tool for many purposes such as to flush out cuttings on the bottom of the borehole. Drilling fluids are often corrosive which increases the difficulty of making a successful seal. A borehole created by drilling can have various temperature and pressure ranges as the depth of the borehole increases. Due to the large range and subsequent combinations of temperatures and pressures along the depth of the borehole, a robust seal design is necessary to protect the electrical transmission line of a data transmission system.

BRIEF SUMMARY OF THE INVENTION

Briefly stated, the invention is a sealing system used to seal within an electrical transmission line particularly a coaxial cable. Another aspect of the invention is a system for sealing an electrical transmission line within a string of downhole components.

In accordance with one aspect of the invention, the system includes a plurality of downhole components, such as sections of pipe in a drill string. Each downhole component has a first and second end, with a first communication element located at the first end and a second communication element located at the second end. Each communication element includes a first contact and a second contact. The system also includes a coaxial cable running between the first and second communication elements, the coaxial cable having a conductive tube and a conductive core within it. The system also includes a first and second connector for connecting the first and second communication elements respectively to the coaxial cable. Each connector includes a conductive sleeve, lying concentrically within the conductive tube, which fits around and makes electrical contact with the conductive core. The conductive sleeve is electrically isolated from the conductive tube. The conductive sleeve of the first connector is in electrical contact with the first contact of the first communication element, the conductive sleeve of the second connector is in electrical contact with the first contact of the second communication element, and the conductive tube is in electrical contact with both the second contact of the first communication element and the second contact of the second communication element.

In accordance with another aspect of the invention, the downhole components are sections of drill pipe, each having a central bore, and the first and second communication elements are located in a first and second recess respectively at each end of the drill pipe. The system further includes a first passage passing between the first recess and the central bore and a second passage passing between the second recess and the central bore. The first and second connectors are located in the first and second passages respectively. Preferably, each section of drill pipe has a portion with an increased wall thickness at both the box end and the pin end with a resultant smaller diameter of the central bore at the box end and pin end, and the first and second passages run through the portions with an increased wall thickness and generally parallel to the longitudinal axis of the drill pipe. The box end and pin end is also sometimes referred to as the box end tool joint and pin end tool joint.

In accordance with another aspect of the invention, the downhole components are sections of drill pipe, drill collars, jars, and similar components that would be typically found in a drill string.

In accordance with another aspect of the invention, the system includes a coaxial cable with a conductive tube and core within it, a base component that is placed within the conductive tube, a washer, and a seal stack placed on top of the washer. The seal stack is formed from a combination of an elastomeric component and a load ring component, a detailed description of which will be found below. Each of these seal stack components is placed within the conductive tube with the elastomeric component of the seal stack in a compressive state. The contact extending from the communications element goes through the center portion of these seal stack components thus forming a seal between the contact and the internal diameter of the conductive tube.

In accordance with another aspect of the invention, the method includes placing a seal within a coaxial cable with an electrical lead passing through the seal.

In accordance with another aspect of the invention, the method includes placing a base component inside the conductive tube of the coaxial cable. The base component includes a means to mechanically engage the internal diameter of the conductive tube thus holding the base component in place. The method also includes a washer and seal stack being placed inside the conductive tube with the washer lying on top of the base component and the seal stack on top of the washer. The method further includes a contact, which is pushed through the central portion of the seal stack, the washer, and the base component to an electrical connector placed beyond the base component thus making electrical communication with the coaxial cable. If necessary the contact passes through a tubular spacer which then forces the seal stack within the conductive tube as the contact is pushed through each of the seal stack components.

BRIEF DESCRIPTION OF THE DRAWINGS

The present invention, together with attendant objects and advantages, will be best understood with reference to the detailed description below in connection with the attached drawings.

FIG. 15 is an enlarged close up view of a partial cross-section of another embodiment of the invention showing angled annular components.

FIG. 16 is an enlarged close up view of a partial cross-section of another embodiment of the present invention showing a rigid component including a double sided trough.

DETAILED DESCRIPTION OF THE INVENTION AND THE PREFERRED EMBODIMENT

It should be noted that, as used herein, the term "downhole" is intended to have a relatively broad meaning, including such environments as drilling in oil and gas, and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

Figure 1:
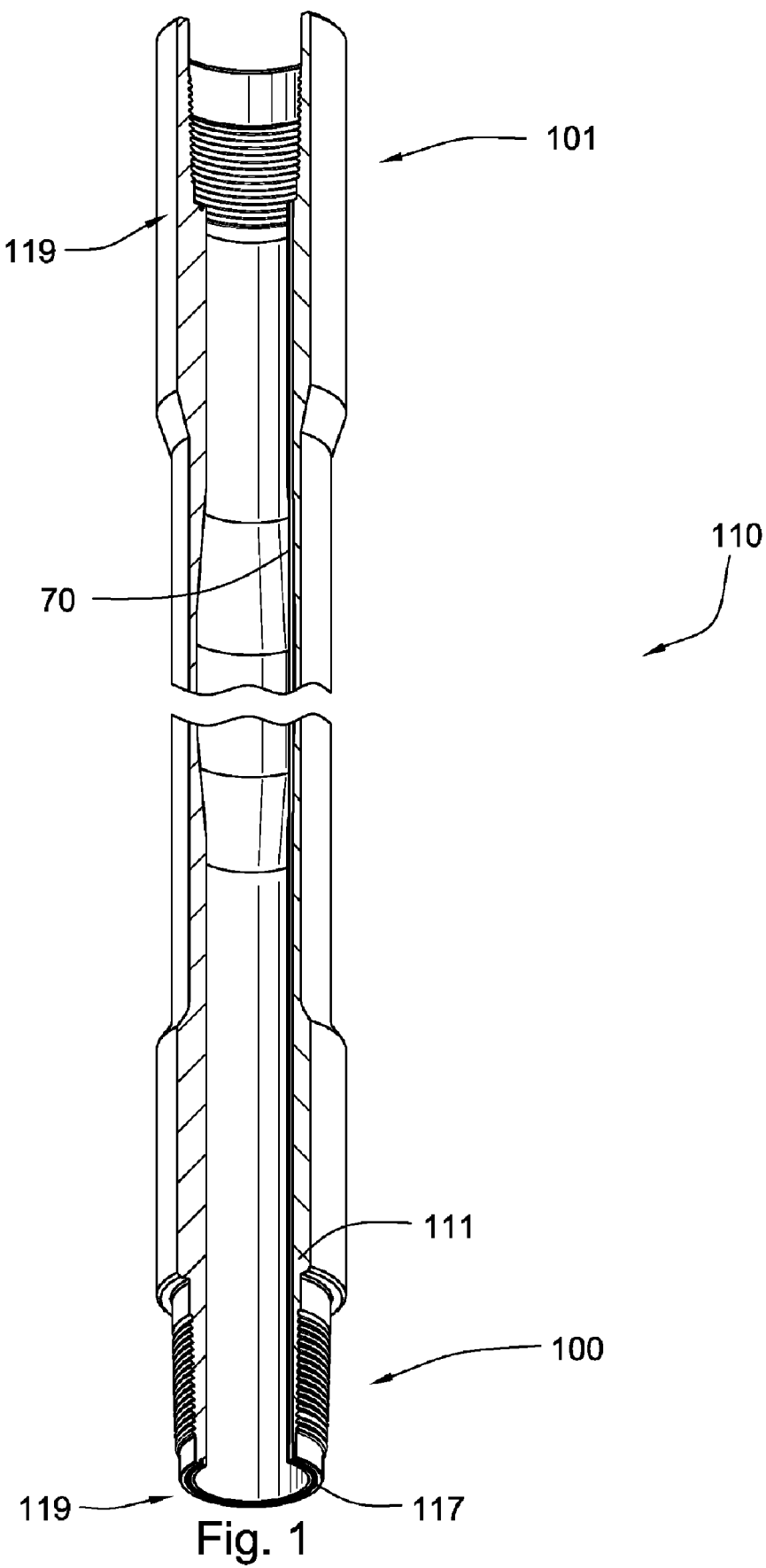
FIG. 1 is a partial cross sectional view of a drill pipe including a box end tool joint and pin end tool joint.
Figure 17:
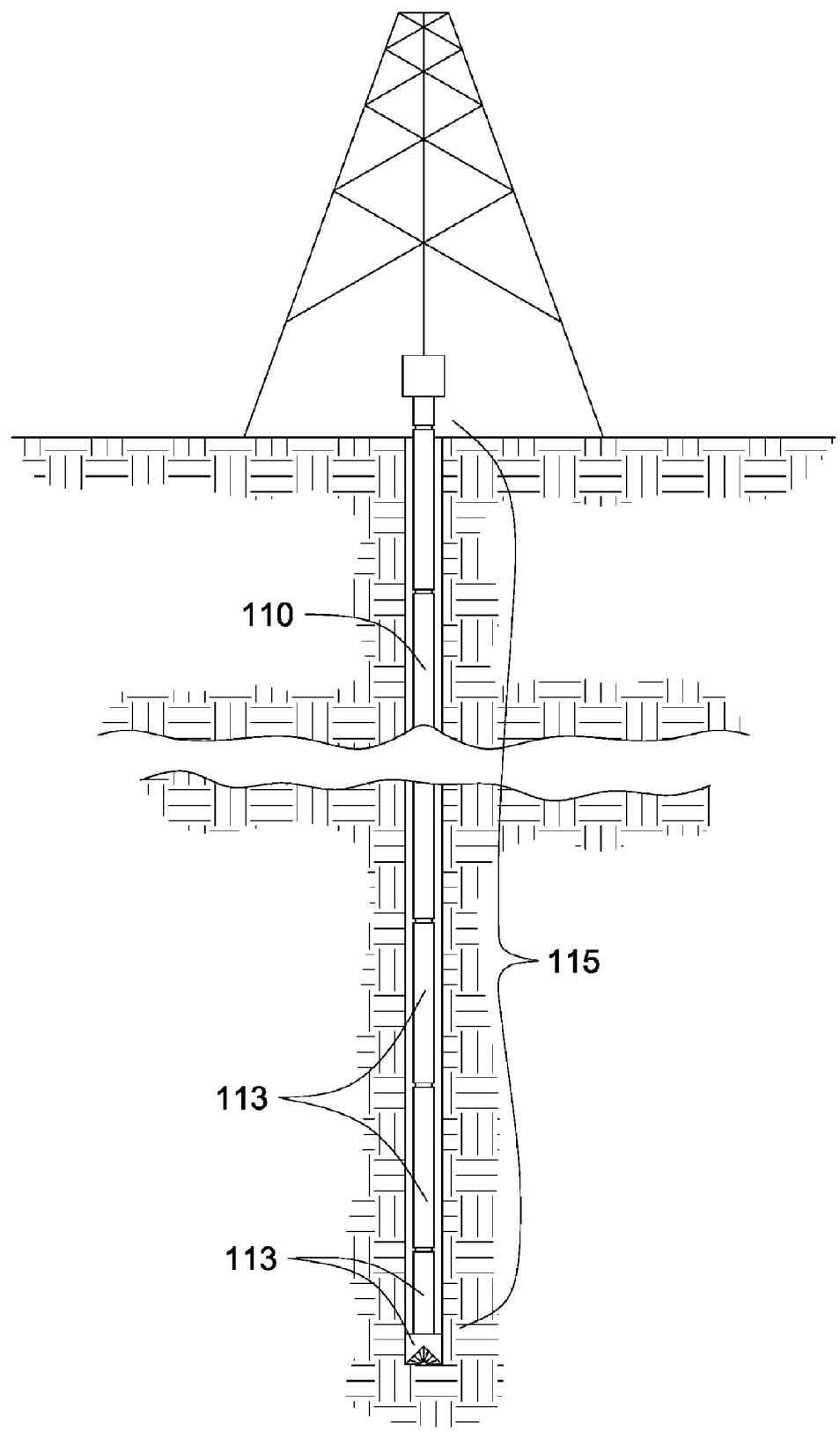
FIG. 17 is a cross sectional view of a drilling rig drilling a borehole into the earth.

Referring to the drawings FIGS. 1 and 17, is a partial cross sectional view of a drill pipe 110 used as a downhole component 113 in a drill string 115. Drill strings are used in the drilling industry for drilling boreholes into the earth to explore for and recover minerals from the earth. Drill strings 115 find particular use in the oil well drilling industry, but may also be used, for example, for mining other minerals from the earth, for forming boreholes for tunneling, for geothermal drilling and the like. Typical downhole components 113 may include sections of drill pipe 110, drill collars, jars, drilling motors, measuring while drilling tools, stabilizers, and other downhole components that are well know to those of ordinary skill in the art.

Figure 3:
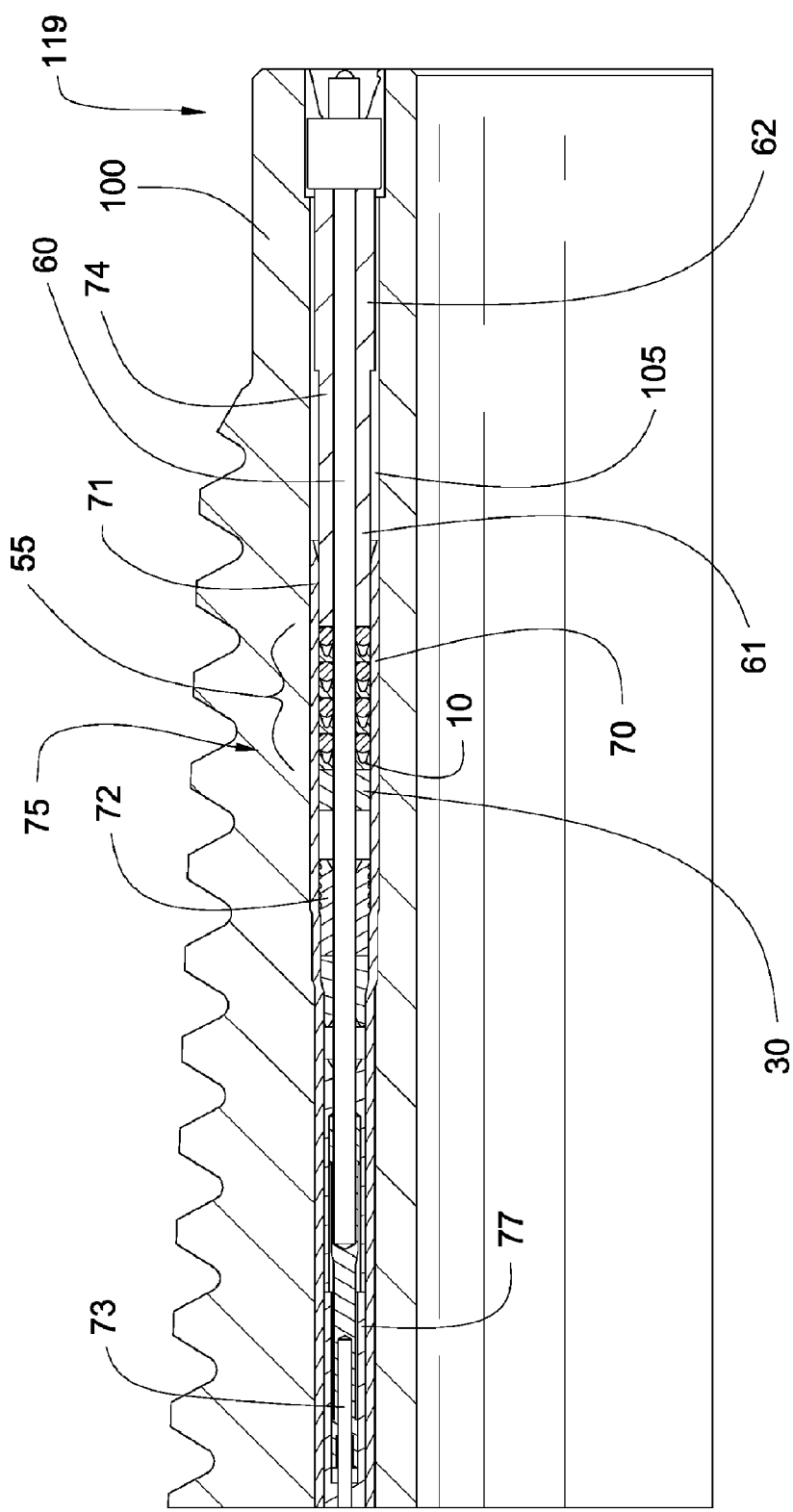
FIG. 3 is a cross sectional view of the pin end tool joint along the lines 5—5 of FIG. 2.

A typical drill pipe 110 includes a box end tool joint 101 and pin end tool joint 100. The drill pipe 110 is also shown fitted with a transmission system 111 which includes a coaxial cable 70 disposed within the drill pipe 110 and running generally along its length, and also includes at least one communications element 117 fitted proximate one of the ends 119 of the drill pipe 110. As shown in FIG. 3, the coaxial cable 70 includes a conductive tube 71 and a conductive core 73 within it, which will be evident from the other drawings of the invention. In a preferred embodiment the drill pipe will include tool joints as depicted in FIG. 1 however, a drill pipe without a tool joint can also be modified to house a coaxial cable 70 and thus tool joints are not necessary for the invention. The coaxial cable 70 could be disposed in other downhole tools such drill collars, jars, and similar downhole components that would be typically found in a drill string. Additionally the coaxial cable 70 could be disposed within other downhole components used in oil and gas or geothermal exploration through which it would be advantageous to transmit an electrical signal and thus require a seal.

Between the pin end 100 and box end 101 is the body of the section. A typical length of the body is between 30 and 90 feet. Drill strings in oil and gas production can extend as long as 20,000 feet, which means that as many as 700 sections of drill pipe and downhole tools can be used in the drill string.

The conductive tube 71 is preferably made of metal, more preferably a strong metal, most preferably steel. By "strong metal" it is meant that the metal is relatively resistant to deformation in its normal use state. The metal is preferably stainless steel, most preferably 316 or 316 L stainless steel. A preferred supplier of stainless steel is Plymouth Tube, Salisbury, Md.

In an alternative embodiment, the conductive tube 71 may be insulated from the pipe in order to prevent possible galvanic corrosion. At present, the preferred material with which to insulate the conductive tube 71 is PEEK®.

Figure 2:
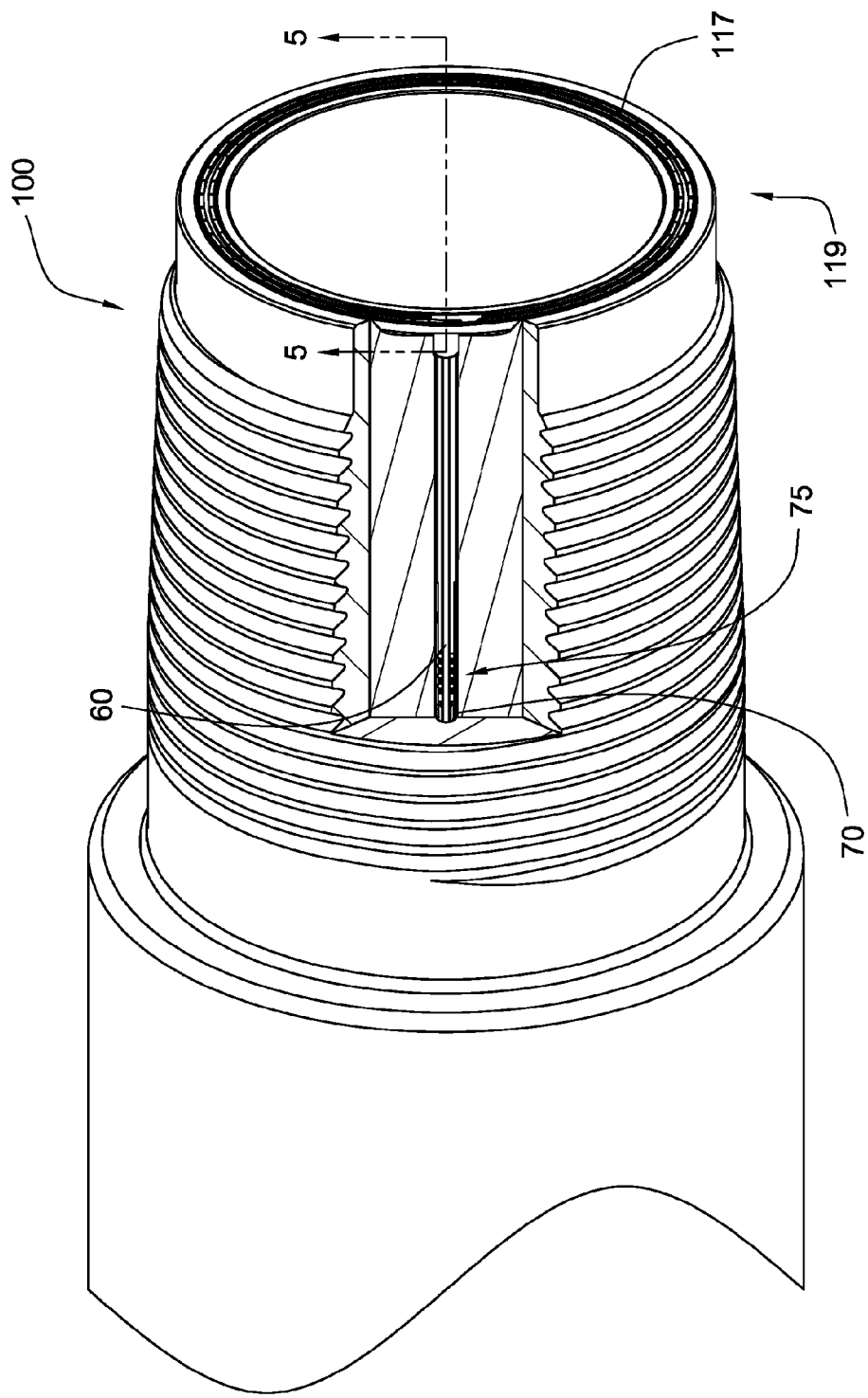
FIG. 2 is a close up of a partial cross sectional view of the pin end of FIG. 1.

FIG. 2 shows a close up of the pin end 100 of the drill pipe 110 in FIG. 1. A partial cross section of the pin end 100 shows the placement of the coaxial cable 70 and the coaxial cable seal system 75 of the present invention. A communications element 117 is disposed within the pin end 100. A contact 60 is shown passing from the communications element 117 to a connector 77 within the coaxial cable 70 the detail of which will be shown in the remaining figures.

With reference now to FIG. 3 of the present invention which is a cross sectional view of the pin end 100 along lines 5—5 in FIG. 2, the placement of the coaxial cable seal system 75 will be described. The pin end 100 includes a bore 105 within the pin end annular wall for placing the coaxial cable 70. An annular base component 72 is disposed within the coaxial cable 70, which includes a conductive tube 71 and conductive core 73 within it. The base component 72 may include a means for engaging the inner surface of the conductive tube 71 of coaxial cable 70 such as barbs or teeth anchor the coaxial cable 70 at one of the ends 100, 101 of the drill pipe 110. Preferably the base component 72 is affixed in the conductive tube 71 by the tube somewhat compressing the base component thereby holding it in place. A washer 30 rests on the annular base component 72. The annular base component 72 and the washer 30 must be sized such that they may fit and move within the conductive tube 71.

The washer is preferably constructed of a stiff material such as ceramics, plastics, or garolite, a grade of fiberglass. The ceramics could be cemented tungsten carbide, alumina, silicon carbide, silicone nitride, and polycrystalline diamond. The plastics are preferably made of a thermoplastic material such as polyether ether ketone or polyether ketone ketone. Other alternative materials include fiber reinforced composite materials, polyamide, electrically insulated metal, or other suitable material having high temperature resistance and high sheer strength in order to maintain its shape without significant creeping under high temperatures and pressures.

A seal stack 55 comprising at least one relatively stiff, annular load ring component 10, 13, 31, 32, 33, 112 and at least one annular elastomeric component 20, 25, 26, 120, 125 is placed on top of the washer 30 and adapted to seal the annular space between the inside surface of the conductive tube 71 of coaxial cable 70 and the contact 60 by being compressed within the conductive tube 71. A load ring component 10 is placed first on the washer 30 as part of the seal stack. A contact 60 passes through the seal stack 55, washer 30, and annular base component 72 into a connector 77, which connects the contact 60 to the conductive core 73 of the coaxial cable 70. This allows electrical communication between the communications element 117 and the coaxial cable 70, and allows the communications element 117 to be removably connected to, and in electrical communication with the conductive core 73 of the coaxial cable 70.

Because corrosion can be a problem in these downhole environments, the connector 77, the contact 60, and/or the conductive core 73 may be coated with a corrosion resistant material. Suitable corrosion resistant coatings may include platings and/or claddings of gold, of conductive noble metallic alloys, or of any other conductive, corrosion resistant metallic material. Additionally, the connector 77, the contact 60, and/or the conductive core 73 may be made corrosion resistant by dipping or painting with conductive paints or other suitable liquid coatings having conductive properties. They may also be coated with a liquid repelling insulating material such as a grease, gel, plastic, etc. The conductive core may have multiple coatings. A steel wire may be coated with a copper coating to increase the conductivity of the core, and the gold coating may surround the copper coating to prevent the galvanic corrosion. Other coatings such as silver and nickel may also be cladded to the conductive core.

It may be necessary to use a tubular spacer 74 to dispose the seal stack 55 and other elements within the coaxial cable 70. To do this the tubular spacer 74 would have a first and second end. The first end 61 has a smaller diameter than the internal diameter of the conductive tube 71 of coaxial cable 70 allowing it to be inserted into the conductive tube 71 and thus forcing the seal stack 55 on top of the washer 30. The second end 62 can have a larger diameter than first end 61 though not integral to its functionality.

Figure 4:
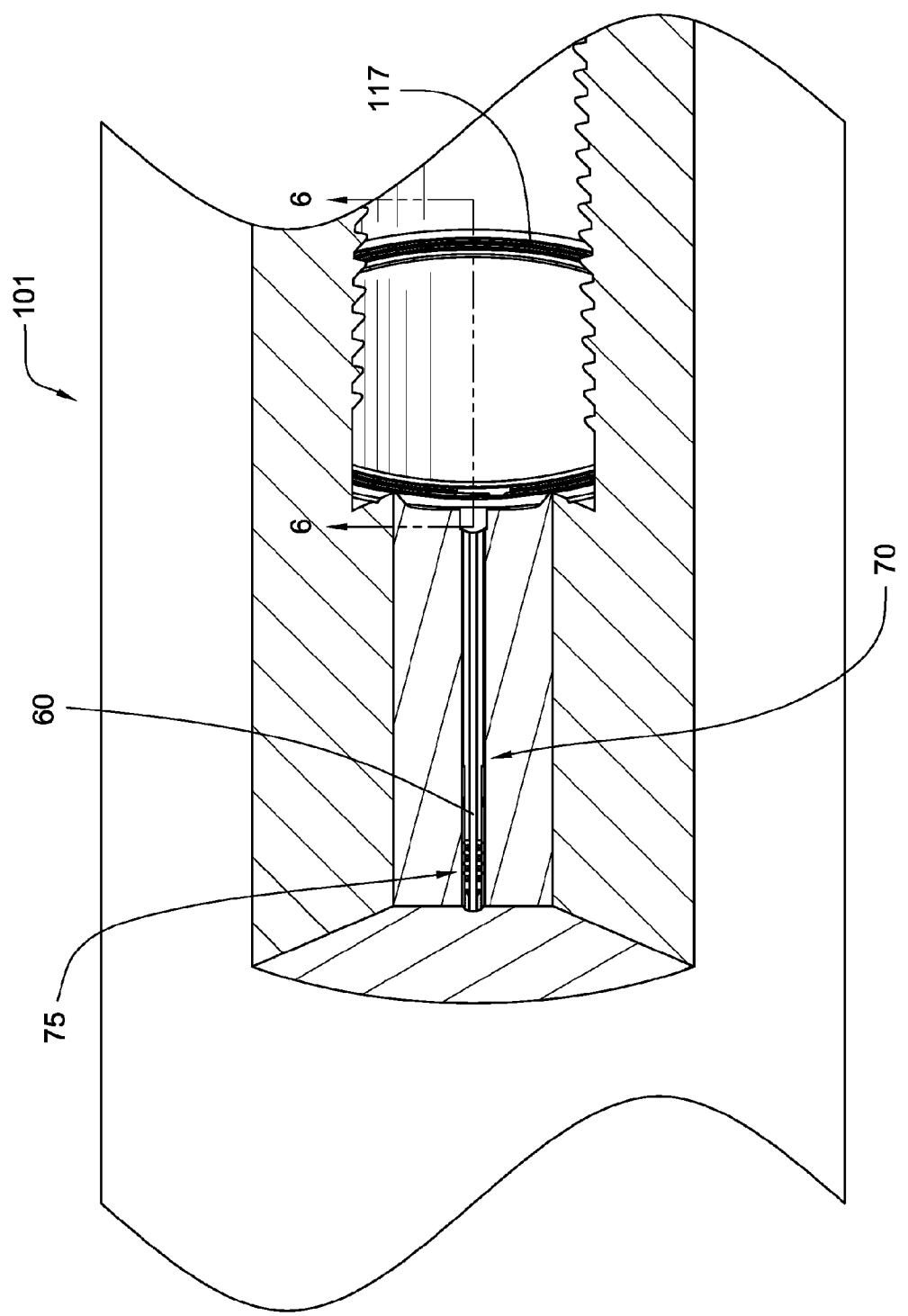
FIG. 4 is a close up of a partial cross sectional view of the box end of FIG. 1.
Figure 5:
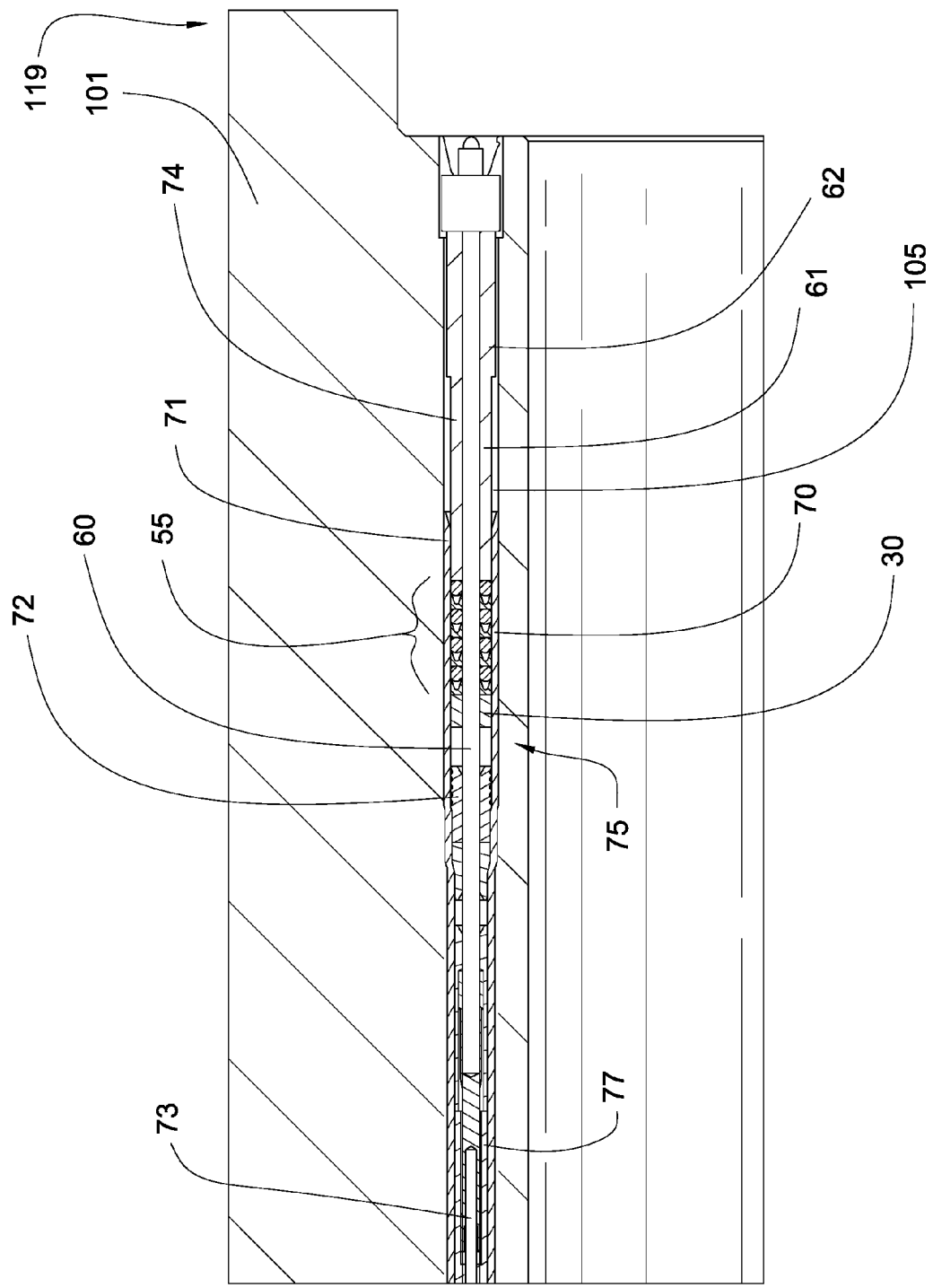
FIG. 5 is a cross sectional view of the pin end tool joint along the lines 6—6 of FIG. 4.

FIGS. 4 and 5 depict the box end tool joint 101 of drill pipe 110 in FIG. 1. FIG. 4 shows a partial cross section of the box end tool joint 101 including the placement of the coaxial cable 70 and the seal system 75 of the present invention. A communications element 117 is disposed within the box end 101. A contact 60 is shown passing from the communications element 117 to a connector 77 within the coaxial cable 70 the detail of which will be shown in the remaining figures.

Turning now to FIG. 5 of the present invention which is a cross sectional view of the box end 101 along lines 6—6 in FIG. 4, the placement of the coaxial cable seal system 75 (which is quite similar to the pin end 119 arrangement of FIG. 3) will be described. The box end 101 includes a bore 105 within the pin end annular wall for placing the coaxial cable 70. An annular base component 72 is disposed within the coaxial cable 70, which includes a conductive tube 71 and conductive core 73 within it. The base component may include a means for engaging the inner surface of the conductive tube 71 of coaxial cable 70 such as barbs or teeth. Preferably the base component is affixed in the conductive tube 71 by the tube somewhat compressing the base component thereby holding it in place. A washer 30 rests on the annular base component 72. Both the base component 72 and washer 30 are load-bearing bodies needed under the extreme environment of high temperature and high pressure to help prevent the seal stack 55 from extruding. It is understood that high temperature is preferably above 300° F. and high pressure is preferably above 10,000 psi.

A seal stack 55 comprising at least one of the load ring components 10, 13, 31, 32, 33, 112 and at least one of the elastomeric components 20, 25, 26, 120, 125 is placed on top of the washer 30 and adapted to seal the annular space between the inside surface of the conductive tube 71 of coaxial cable 70 and the contact 60. A load ring component is placed first on the washer 30 as part of the seal stack. A contact 60 passes through the seal stack 55, washer 30, and annular base component 72 creating electrical communication between the communications element 117 and the coaxial cable 70. It may be necessary to use a tubular spacer 74 to dispose the seal stack 55 and other elements within the coaxial cable 70. To do this the tubular spacer 74 would have a first and second end. The first end 61 has a smaller diameter than the internal diameter of the conductive tube 71 of coaxial cable 70 allowing it to be inserted into the conductive tube 71 and thus forcing the seal stack 55 on top of the washer 30. The second end 62 may have a larger diameter than first end 61 in the preferred embodiment though this feature is not integral to its functionality.

Figure 6:
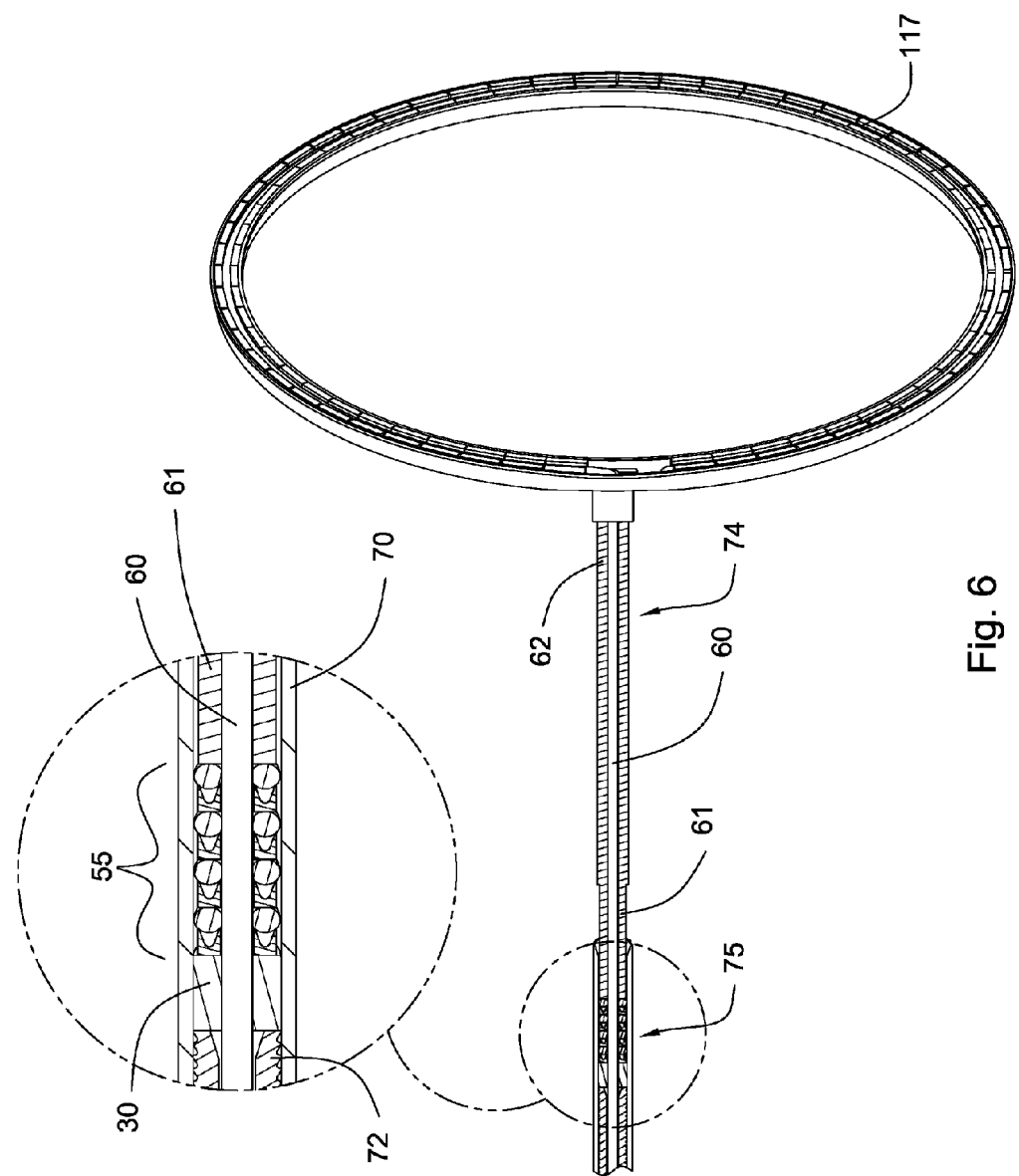
FIG. 6 is a partial cross-section of the coaxial cable including a close up view showing an embodiment of the invention.

Shown in FIG. 6 is the communications element 117 and coaxial cable 70 in plain view outside its setting of a drilling component. The contact 60 is shown passing from the communications element 117 through the tubular spacer 74 including first and second ends 61, 62 respectively. A detailed close up of the seal stack and associated geometry is shown in the magnified circle view. The annular base component 72 including barbs for engaging the conductive tube 71 internal surface is shown. The washer 30 is placed in between the seal stack 55 and the annular base component 72. Though this magnified view shows the basic geometry and shape of the seal stack a more detailed discussion of the discrete components comprising the seal stack 55 will follow.

The contact 60 is shown passing through the seal stack 55, washer 30, and annular base component 72 to the connector 77 below (as shown in FIG. 3). The first end 61 of the tubular spacer 74 abuts the seal stack 55 thus forcing the seal stack into the conductive tube 71 of coaxial cable 70. The elastomeric components 20, 25, 26, 120, 125 of seal stack 55 are in compression thus sealing the annular space between the conductive tube 71 of coaxial cable 70 and the contact 60.

Figure 7:
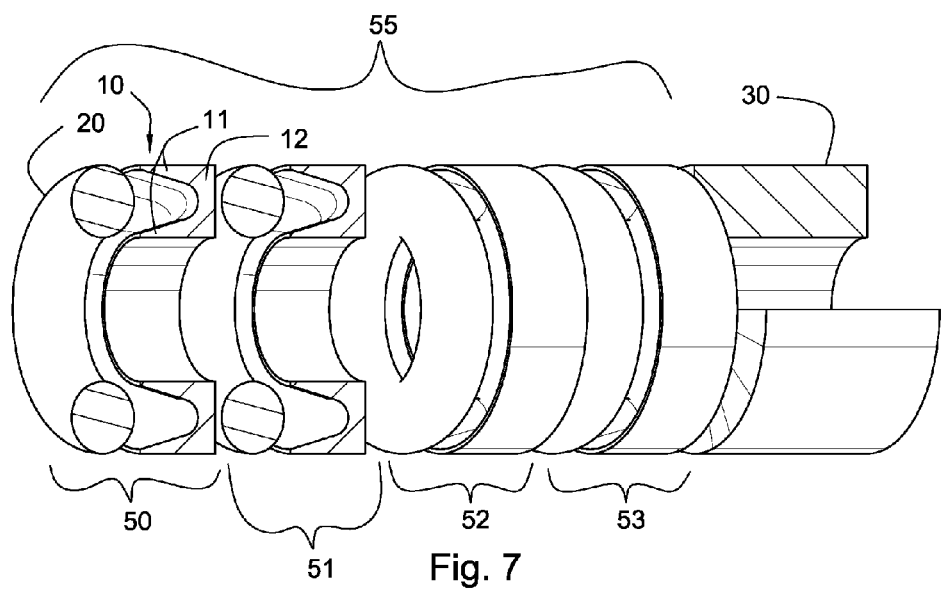
FIG. 7 is a close up view of a partial cross-section of a preferred embodiment of the seal system of the present invention.
Figure 8:
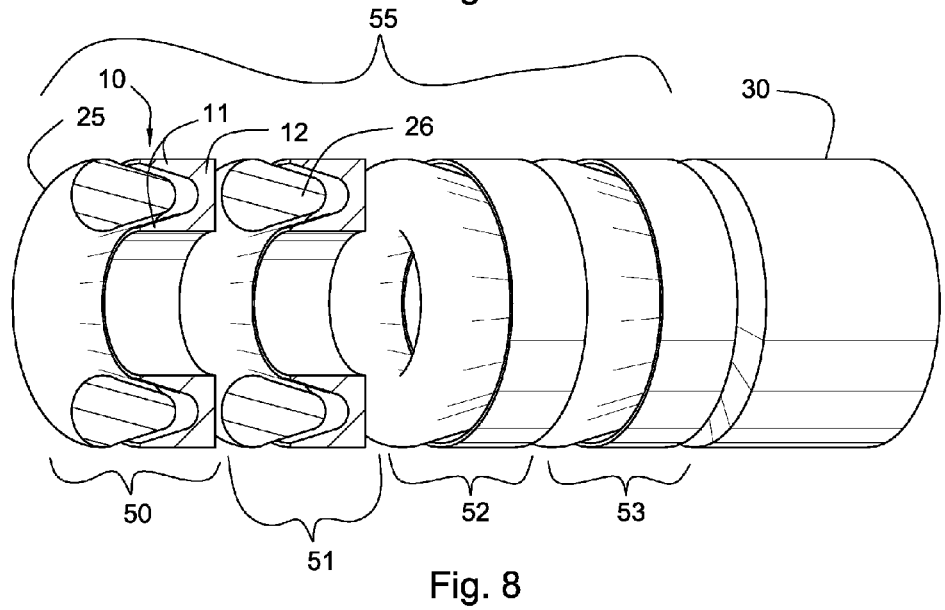
FIG. 8 is a close up view of a partial cross-section of another embodiment of the seal system of the present depicting a modified elastomer component.

With reference now to FIGS. 7 and 8 the seal stack components and resultant geometries will be described including varying embodiments of the invention wherein like parts are represented by like numerals. FIG. 7 is a preferred embodiment of the invention including the washer 30 and a plurality of seal stacks 55. As shown in the previous drawings in its most preferred embodiment the coaxial cable seal system 75 will include a plurality of individual seal stacks 55 though one seal stack can be used. A first, second, third, and fourth seal stack 53, 52, 51, and 50 respectively are placed serially on top of each other within the conductive tube 71.

The seal stack 55 comprises a load ring component 10 with a base 12 that is generally flat and arms 111 extending from the base and at least one elastomeric component 20, 25, 26, 120, or 125. The extending arms 111 form a trough in the load ring component 10. In this embodiment the shape of the trough is generally v-shape with a concave bottom surface. The load ring component 10 must be simultaneously rigid and flexible in operation. It is an anti-extrusion ring under low-pressure conditions and a flexible sealing ring under high temperature and high-pressure conditions. The trough placed on one side of the load ring component 10 endows it with its needed flexibility under periods of load. It must also be sized such that it can move freely within the conductive tube. Therefore, the load ring component 10 is not compressed with the conductive tube 71, although in operation, portions of it may contact the inside of the conductive tube 71.

An elastomeric component 20 is placed on each load ring component 10 above the trough. The elastomeric component 20 could be an elastomeric o-ring and is the most preferred form in the present invention. An alternative shape could be an x-ring sometimes referred to as a quad ring or a specialty ring forming a non-traditional shape such as one shown in FIG. 8. The integral feature of the seal stack requires that the volume of the elastomeric component is greater than the volume of the trough in the rigid component, and also that the elastomeric component 20 be compressed within the conductive tube 71. The load ring component 10 prevents the elastomeric component from flowing and breaking its seal between the inner surface of the conductive tube 71 and the contact, which may otherwise occur under high pressure and temperature conditions. A more detailed discussion of these features is found below.

Turning now to FIG. 8, which depicts an alternative embodiment of the invention, as shown, the basic geometry of the washer 30 remains the same. However, the elastomeric component 25 of the seal stack 50 is shaped with one side 26 to mate with the trough of the load ring component 10. The elastomeric component 25 could have an alternative shape on the one side 26 so long as it mates with the corresponding trough shape, alternative forms of which will be depicted in the other figures. The other basic elements of the coaxial cable seal system 75 are the same including the washer 30 and a plurality of seal stacks 55 with elastomeric components 25 and load ring components 10. As described previously, the elastomeric component 25 of the seal stack 50 is compressed within the conductive tube upon assembly to effect a seal.

Figure 9:
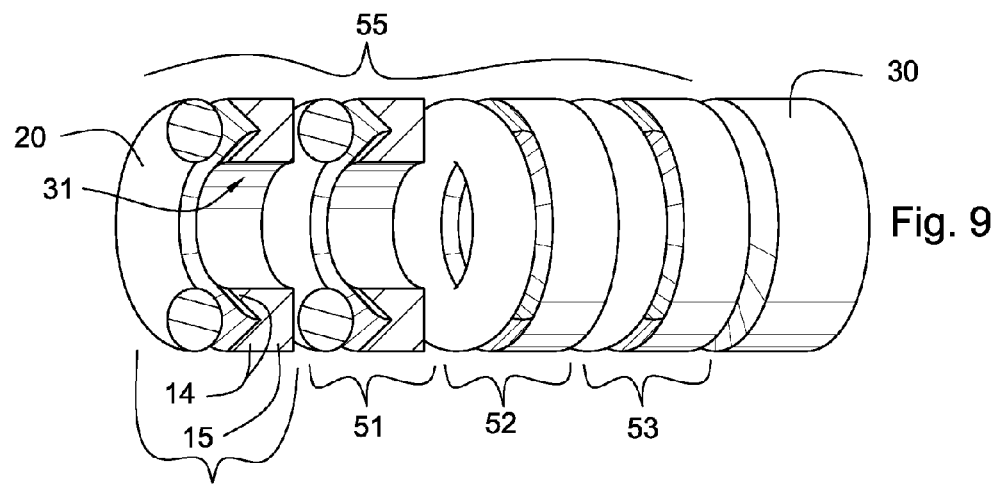
FIG. 9 is a close up view of a partial cross-section of another embodiment of the seal system of the present showing an alternative load ring component shape.

An alternative load ring component is shown in FIG. 9. The load ring component 31 includes a base 15 with extending arms 14. The extending arms 14 form a v-shape trough without the concave surface as shown in FIG. 7. This shape allows for a stiffer rigid component and reduced flexibility as deemed necessary for the application. In this embodiment the depth of the trough is less than half of the load ring component overall height. In the previously discussed embodiments the depth of the trough is over half the height of the rigid component. Note still that the volume of the elastomeric ring 20 is greater than the volume of the v-shaped trough in the rigid load ring component 31. The other members of the seal system 75 including the washer 30 and the plurality of seal stacks 55 are the same. Regardless of its configuration, the load ring component 31 is not compressed within the conductive tube 71.

Figure 10:
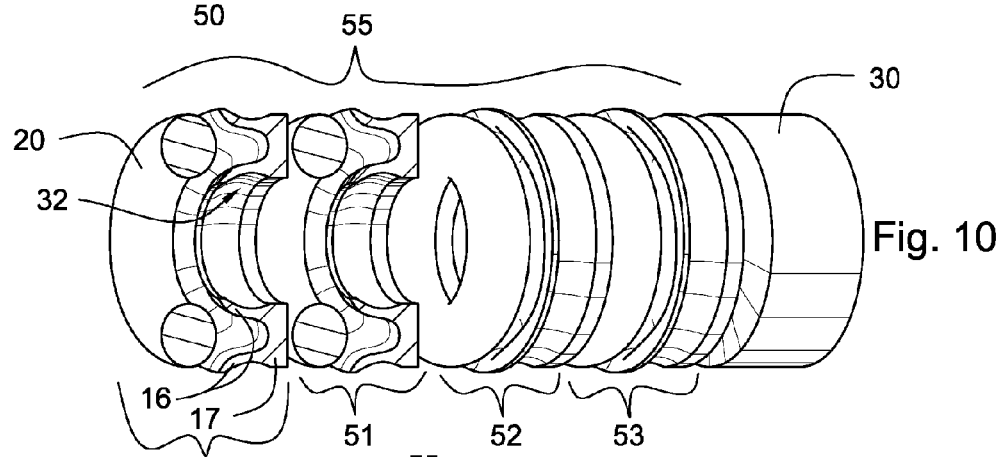
FIG. 10 is a close up view of a partial cross-section of another embodiment of the seal system of the present showing an alternative load ring component shape.

FIG. 10 discloses another alternative shape for the load ring component of the seal stack. The rigid load ring component 32 of seal stacks 50, 51, 52, and 53 includes a base 17 with extending arms 16. The extending arms 16 form an arcuate sidewall. This feature gives the load ring component more tractability as is deemed necessary for the application. The remaining elements of the coaxial cable seal system 75 including the washer 30 and a plurality of seal stacks 55 placed serially on top of each other remain the same as previous embodiments.

Figure 11:
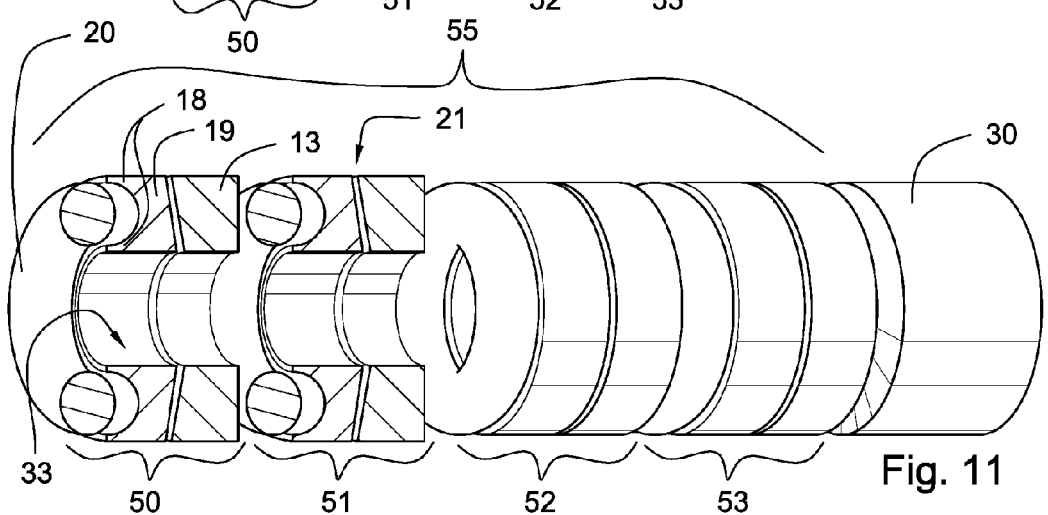
FIG. 11 is a close up view of a partial cross-section of another embodiment of the invention showing a two part load ring component.

In the embodiment of FIG. 11, the load ring component is split into two parts a first and second rigid ring 13 and 33 respectively. The first ring 13 has a generally flat bottom surface and the topside forms a complimentary angle 21 with the base 19 of the second ring 33. The complimentary angle augments its strength to withstand the pressure load. The second ring 33 also includes arms 18 extending from the base 19. In this drawing the trough forms a half circle bottom. This is simply another example of the possible shape of the trough although the trough in this embodiment could include the other trough shapes of previously discussed load ring component embodiments. The seal stack then includes a two part load ring component 13, 33 and an elastomer ring 20. The plurality of seal stacks 55 lying serially on top of each other includes each component of the individual seal stacks 50, 51, 52, and 53. In one embodiment of the invention the first rigid ring is made of a thermoplastic material such as PEEK® or PEKK. PEEK® is a registered trademark of Victrex, PLC Corporation and is a trade name for the chemical compound polyether ether ketone. PEKK is an acronym for polyether ketone ketone; both PEEK® and PEKK are thermoplastic polymers which will be discussed in more detail below. The second rigid ring is preferably made of a Teflon material and most preferably of metal filled Teflon, such as Nickel loaded Teflon.

Figure 12:
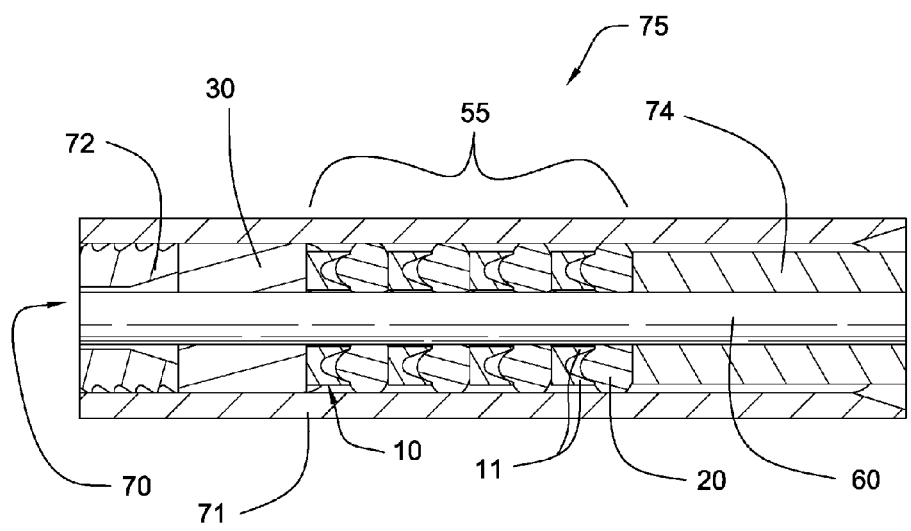
FIG. 12 is a close up cross sectional view of the seal system of the present under low pressure.
Figure 13:
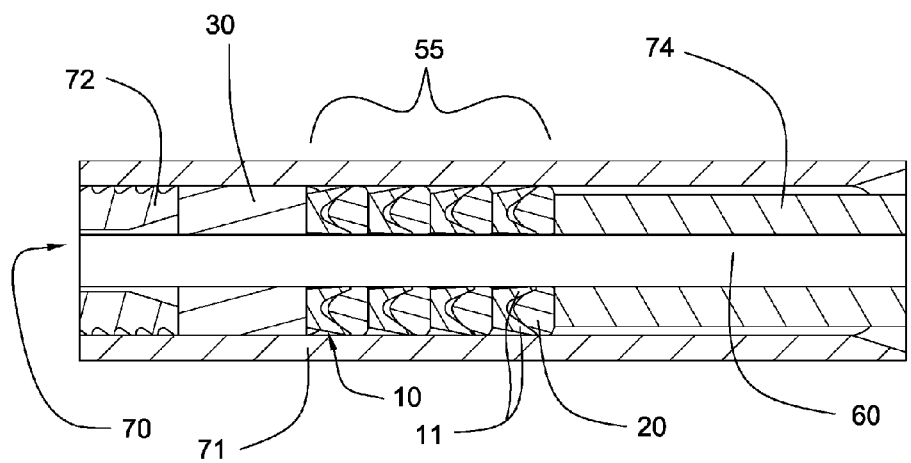
FIG. 13 is a close up cross sectional view of the seal system of the present under high pressure and high temperature conditions.

Shown in FIGS. 12 and 13 is a depiction of the coaxial cable seal system 75 under a low-pressure environment and a high pressure and high temperature environment respectively. The plurality of seal stacks 55 depicts the seal system 75 embodiment as shown in FIG. 7. Under a low pressure environment as shown in FIG. 12, the elastomeric ring 20 is compressed which forms a seal between the inside surface of the conductive tube 71 of coaxial cable 70 and the contact 60 passing through the center of the tubular spacer 74, the plurality of seal stacks 55, the washer 30, and the annular base component 72. In this embodiment the diameter of the load ring component 10 is less than the internal diameter of the conductive tube 71 of coaxial cable 70. The arms 111 of the load ring component 10 offer stiff resistance to the elastomeric ring 20 thereby enabling elastomeric component 20 to shorten axially and thus expand radially to engage the two surfaces enclosing the annular space. Effectively in a low pressure environment the elastomeric component becomes a low-pressure seal and the load ring component 10 an anti-extrusion ring.

A high pressure and temperature drilling environment is generally found in deeper wells where the temperature and pressure increases with the depth of the drilling component in the well. Such extreme conditions require more robust seal designs and materials. FIG. 13 depicts the current coaxial cable seal system 75 in such an extreme environment wherein the effect of the high pressure and temperature causes the plurality of seal stacks 55 to sandwich together. The annular base component 72 engages the inside surface of the conductive tube 71 of coaxially cable 70 thus maintaining its position within the coaxial cable 70. A washer 30 is placed on top of the annular base part 72 which increases the stiff resistance to the pressure load of the seal stacks 55 from above. As pressure and temperature increase the elastomeric component becomes less of a low-pressure seal and more of a high-pressure load ring. The load ring component 10 becomes less rigid and more flexible under higher temperatures and pressures. In effect, the load ring component becomes a high-pressure seal. The extreme pressures and temperatures cause the seal stacks 55 to shorten axially wherein the elastomeric component 20 fills the trough causing the arms 111 to bow and thus expand radially outwardly to engage the surface of the conductive tube 71 of coaxial cable 70 and inwardly to engage the surface of the contact 60 thus forming a seal adjacent a tubular spacer 74. Because they are compressed within the conductive tube 71, the elastomeric components 20, 25, 26, 120, 125 engage both the surface of the conductive tube 71 and the contact, increasing seal robustness. It can be seen from the description and appended drawings that under extreme temperature and pressure conditions that if the elastomeric component didn't have a greater volume than that of the trough in the load ring component, then it would fill the trough without causing the load ring component to engage the surrounding side walls and form a seal. The elastomeric component would simply fill in the trough and conform its shape to that of the trough.

Figure 14:
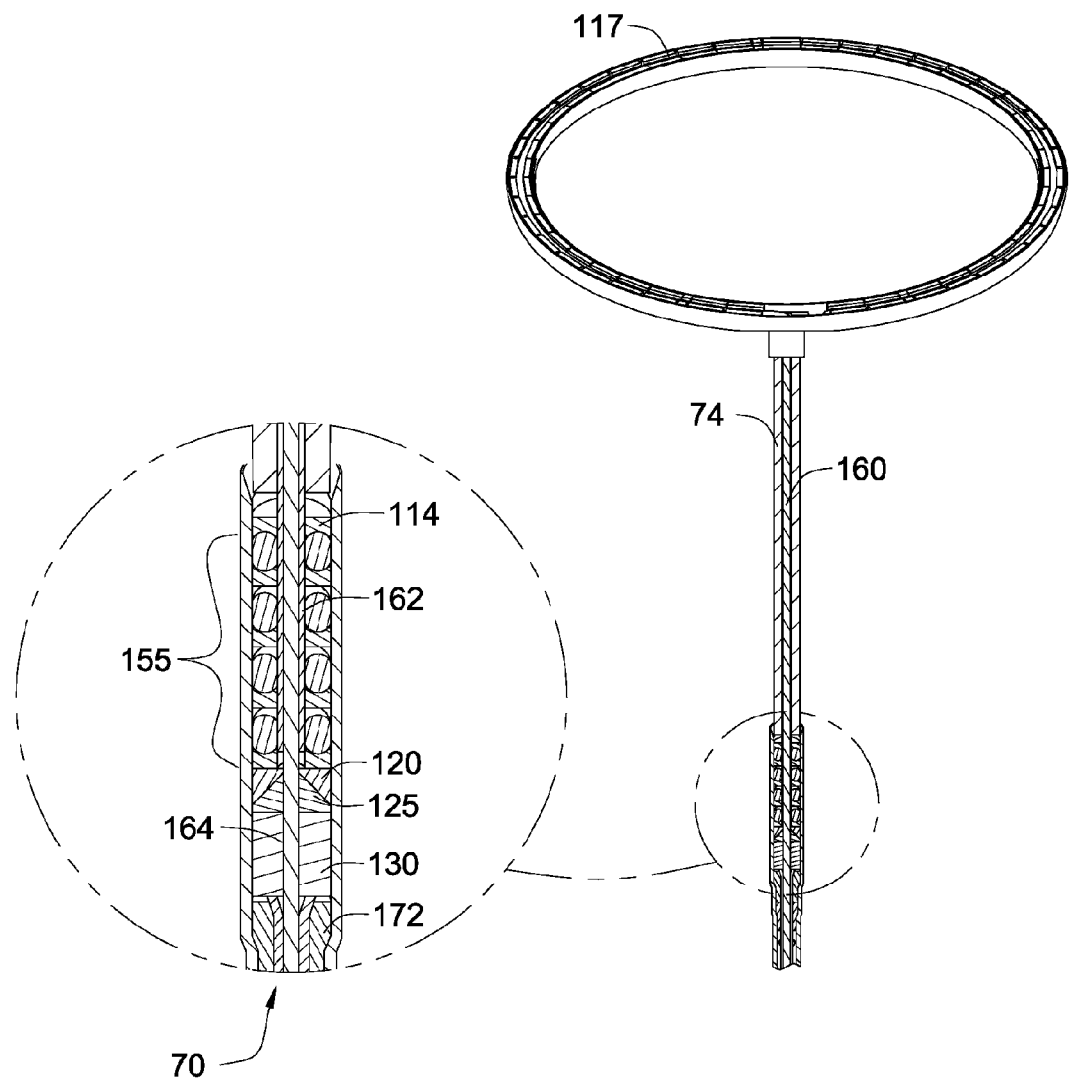
FIG. 14 is a partial cross-section of the coaxial cable including a close up view showing another embodiment of the invention showing angled annular components.

FIG. 14 is a partial cross-section of the coaxial cable 70 including a close-up view illustrating the preferred embodiment of the present invention. A contact, preferably a wire 160 insulated with an insulating polymer, passes through a tubular spacer 74. Most preferably the wire 160 includes an insulated portion 162 and a non-insulated portion 164 as shown in the close-up view. The insulated portion of the wire passes through the tubular spacer and the seal stack 155. The seal stack components will be shown in greater detail in the remaining figures. The non-insulated portion of the wire passes through a second angled annular component 120, a first angled annular component 125, the washer 130, and the base component 172. It is most preferable that the inner diameter of the angled annular components is smaller than the diameter of the insulated portion of the wire. Thus when the wire goes through the seal stack components, it cannot go beyond a certain point, that being where there is diametrical interference between the inner diameter of the angled annular components and the diameter of the insulated portion of the wire. This helps prevent the wire from 'blowing through' the seal stack under high pressures. Preferably the insulating polymer of the wire is bonded to the wire to help prevent this phenomenon from occurring.

Further, an insulating polymer of PEEK®, PEKK, or other polymer may be bonded to the wire. Bonded PEEK® may prevent further moisture from contacting the wire. A sleeve of PEEK®, PEKK, or other polymer may be heat shrunk to the wire before the wire is inserted within the seal stack. PEEK® may be desirable as an insulating polymer because of its high melting point, which may be as high as 340 degrees Celsius.

FIGS. 15 and 16 are enlarged close up views of a partial cross section of the two embodiments of the coaxial cable seal system 75 design shown in FIG. 14. FIG. 15 shows the washer 130 with the first angled annular component 125 lying adjacent the washer and the second angled annular component 120 lying adjacent the first angled annular component 125 such that the angles supplement each other or in other words they form supplementary angles. The angles are preferably fifty degrees though they can be as large as 60 to 70 degrees or as small as 45 to 35 degrees. A seal stack 150, comprising at least one annular rigid load ring component 112 and at least one annular elastomeric component 20, lies adjacent the second angled annular component 120. As shown in the figure, preferably the seal system 75 comprises four seal stacks lying serially on top of each other. The annular rigid load ring component 112 has a trough comprising a first volume and the annular elastomeric component 20 comprises a second volume, wherein the first volume is less than the second volume. A terminating annular rigid component 114 at the 'top' end of the seal stacks, in contact with the tubular spacer 74 and having a trough, lays adjacent the seal stack with the trough partially housing the annular elastomeric component. One modification to this system is shown in FIG. 16 wherein the annular rigid component of at least one of the seal stacks comprises a double sided trough 116. Preferably the seal stack lying adjacent the angled annular component has the trough on one side whereas the remaining seal stacks comprise the annular rigid component with a double sided trough. This allows the annular elastomeric components 20, 25, 26, 120, 125 of each neighboring seal stack to be partially housed in the trough of each neighboring annular rigid annular component. It is believed this feature allows increased resiliency and life of the seal stack components during use.

In such a difficult setting to form a seal, not only does general shape and design become a key component to success but also choice of materials. Accordingly the load ring component must exhibit physical and mechanical properties that change only moderately under extreme temperature environs allowing some flexibility at the extreme end of its service temperature use. The materials should have high temperature resistance and high sheer strength in order to maintain its basic shape without significant creeping under high pressures and temperatures. Therefore the load ring components 10 are preferably constructed out of a thermoplastic material, such as polyether ether ketone or polyether ketone ketone. Such plastics can be fiber reinforced, glass gilled or carbon filled grades. Other alternative materials include liquid crystal polymers, polyamide, fiber-reinforced composite materials, and electrically insulated metals.

The term elastomer should be understood to represent a material that has relatively no yield point and generally has a low glass transition temperature such as an amorphous polymer that is soft and pliable at room temperature. Preferably the elastomeric component is made of a chemical resistant material that also exhibits temperature resistance. Thus the elastomeric component can be made of materials that are classified according to ASTM D standard 1418 such as FFKM, FKM, NBR, XNBR and HNBR type components with the most preferable material being FFKM or FKM type. FFKM materials are generally known as perfluoroelastomers whereas FKM materials are known as fluoroelastomers.

Kalrez®, a registered trademark of E.I. DU PONT DE NEMOURS AND COMPANY is one such example of a perfluoroelastomer. Simriz, a copolymer of tetrafluoroethylene and perfluorovinyl ether is another example of a perfluoroelastomer. Another preferable perfluoroelastomer is Chemraz®, a registered trademark of Greene, Tweed Company.

Some examples of fluoroelastomers, sometimes also referred to as fluorocarbons, are Aflas®, a registered trademark of Asahi Glass Co., Ltd., and Viton®, a registered trademark of DUPONT DOW ELASTOMERS L.L.C. Aflas® is a copolymer of tetrafluoroethylene and propylene whereas Viton® is a vinylidene fluoride and hexafluoropropylene copolymer. NBR is generally known as acrylonitrile Butadiene, HNBR as a highly saturated nitrile, and XNBR as a carboxylated Nitrile.

Another material property under consideration in choosing a suitable elastomer material is the hardness as measured on a Shore A scale. Preferably the hardness is at least 70 on a Shore A scale though in some instances a Shore A 90 hardness might be preferable. Increasing the hardness of the elastomeric material decreases its tendency to flow under high pressures thus decrease its likelihood of extrusion. For instance, the first and second seal stack 53, 52 could be an elastomeric material with a Shore A hardness of at least 90 with the third and fourth seal stack 51, 50 at least a 70 on a Shore A hardness scale. Such a configuration would allow the seal stacks 51, 50 to perform better under lower pressures with the seal stacks 52, 53 better suited for higher pressures and temperatures.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

It is therefore intended that the foregoing detailed description be regarded as illustrative rather than limiting, and that it be understood that it is the following claims, including all equivalents, that are intended to define the spirit and scope of this invention.

What is claimed is:

1. A coaxial cable seal system comprising:
   a coaxial cable comprising a conductive tube and a conductive core within said tube, the conductive tube having within said tube a base component anchored proximate an end of a downhole component;
   a communications element mounted in the downhole component intermediate the base component and the end of the downhole component, the communications element having an electrically isolated contact adapted to be in removable electric communication with the conductive core;
   the coaxial cable seal system comprising at least one seal stack comprising an annular elastomeric component and at least one load ring component;
   wherein the coaxial cable seal system is disposed between the tube and the electrically isolated contact to provide a seal therebetween.

2. The coaxial cable seal system of claim 1 wherein the downhole component is selected from the group consisting of tool joints, drill pipe, drill collars, jars, drilling motors, measuring while drilling tools, and stabilizers.

3. The seal system of claim 1 further comprising:
   a tubular spacer extending from the transmission element and, upon assembly, lying adjacent a terminating annular rigid component of the seal stack,
   the electrically isolated contact passing, in order, through the tubular spacer, the terminating annular rigid component, at least one seal stack, a plurality of angled annular components, a washer, and the base component.

4. The seal system of claim 3 comprising more than one seal stack lying serially on top of each other within the conductive tube of the coaxial cable.

5. The seal system of claim 4 wherein the contact is wire insulated with an insulating polymer.

6. The seal system of claim 5 wherein the wire has an insulated portion and a non-insulated portion.

7. The seal system of claim 6 wherein the insulated portion passes through the tubular spacer, the terminating annular rigid component and the seal stack and the non-insulated portion through the angled annular components, the washer, and the base component.

8. The seal system of claim 6 wherein an inner diameter of the angled annular components is smaller then a diameter of the insulated portion of the wire.

9. The seal system of claim 3 comprising first and second angled annular components in the seal stack wherein supplementary angles of the first and second angled annular components are approximately fifty degrees.

10. The seal system of claim 3 wherein the load ring component of at least one of the seal stacks comprises a double sided trough.

11. The seal system of claim 1 wherein the elastomeric component comprises an o-ring.

12. The seal system of claim 1 wherein the elastomeric component comprises an x-ring.

13. The seal system of claim 1 wherein the elastomeric component comprises elastomeric material having a minimum hardness of 70 on a Shore A hardness scale.

14. The seal system of claim 13 wherein the elastomeric component is made of a material chosen from the group consisting of perfluoroelastomers, fluoroelastomers, acrylonitrile butadiene, highly saturated nitrile elastomer compounds, or carboxylated nitrile compounds.

15. The seal system of claim 13 wherein the elastomeric material is made according to the ASTM-D standard 1418, and selected from the group consisting of FKM, FFKM, XNBR, HNBR, and NBR.

16. The seal system of claim 1 wherein the elastomeric component is a chemical resistant material.

17. The seal system of claim 3 wherein a trough of the load ring component is a shallow groove wherein the groove depth is less than half the height of the rigid component.

18. The seal system of claim 3 wherein a trough of the load ring component forms a v-shape.

19. The seal system of claim 3 wherein a trough of the load ring component forms a generally v-shape with a concave bottom.

20. The seal system of claim 3 wherein a trough of the load ring component forms a half circle bottom.

21. The seal system of claim 3 wherein the load ring component is made of polyether ether ketone.

22. The seal system of claim 3 wherein the elastomeric component is placed within a trough formed on one side of the load ring component.

23. The seal system of claim 3 wherein the washer is made of ceramic.

24. The washer of claim 23 wherein the ceramic is selected from the group consisting of cemented tungsten carbide, alumina, silicon carbide, silicone nitride, and polycrystalline diamond.

25. The seal system of claim 3 wherein the washer is made of a plastic material.

26. The seal system of claim 25 wherein the plastic material is selected from the group consisting of polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone.

27. The seal system of claim 3 wherein the washer is made of garolite.

28. The seal system of claim 1 wherein a connector provides electrical communication between the conductive core and the contact.

29. The seal system of claim 28 wherein the connector, the contact, and/or the conductive core are coated with a corrosion resistant material.

30. The seal system of claim 29 wherein the corrosion resistant coating is selected from the group consisting of gold plating, gold cladding, and conductive noble metallic alloys.

31. The seal system of claim 28 wherein the connector, the contact, and/or the conductive core are made corrosion resistant by dipping or painting with conductive paints or liquid coatings having conductive properties.

32. The seal system of claim 28 wherein the connector, the contact, and/or the conductive core are coated with a liquid repelling insulating material.

33. The seal system of claim 32 wherein material is a grease, a gel, or a plastic.

34. An internal coaxial cable seal system for a downhole component, the downhole component comprising:
a coaxial cable comprising a conductive tube and a conductive core, the conductive tube having an end proximate an end of the downhole component and anchored to the downhole component by a base component;
a transmission element mounted in the downhole component intermediate the end of the conductive tube and the end of the component, the transmission element having a contact adapted to be removeably electrically connected with the conductive core;
the internal coaxial cable seal system disposed within the conductive tube intermediate the base component and the end of the tube and comprising a washer lying adjacent the base component and at least one seal stack lying adjacent the washer;
the seal stack comprising an annular elastomeric component compressed within the conductive tube and energized by a load ring component;
wherein the seal stack is adapted to receive and seal the contact within the conductive tube.

35. The seal system of claim 34 comprising more than one seal stack lying serially on top of each other within the conductive tube of the coaxial cable.

36. The seal system of claim 35 wherein the contact is wire insulated with an insulating polymer.

37. The seal system of claim 36 wherein the wire has an insulated portion and a non-insulated portion.

38. The seal system of claim 37 wherein the insulated portion passes through, in order, a tubular spacer, a terminating annular rigid component, and the seal stack;
and the non-insulated portion passes through, in order, a plurality of angled annular components, the washer, and the base component.

39. The seal system of claim 38 wherein an inner diameter of the angled annular components is smaller than a diameter of the insulated portion of the wire.

40. The seal system of claim 38 comprising first and second angled annular components in the seal stack wherein supplementary angles of the first and second angled annular components are approximately fifty degrees.

41. The seal system of claim 34 wherein the load ring component of at least one of the seal stacks comprises a double sided trough.

42. The seal system of claim 34 wherein the elastomeric component comprises an o-ring.

43. The seal system of claim 34 wherein the elastomeric component comprises an x-ring.

44. The seal system of claim 34 wherein the elastomeric component comprises elastomeric material having a minimum hardness of 70 on a Shore A hardness scale.

45. The seal system of claim 44 wherein the elastomeric component is made of a material chosen from the group consisting of perfluoroelastomers, fluoroelastomers, acrylonitrile butadiene, highly saturated nitrile elastomer compounds, or carboxylated nitrile compounds.

46. The seal system of claim 44 wherein the elastomeric material is made according to the ASTM-D standard 1418, and selected from the group consisting of FKM, FFKM, XNBR, HNBR, and NBR.

47. The seal system of claim 34 wherein the elastomeric component is a chemical resistant material.

48. The seal system of claim 34 wherein a trough of the load ring component is a shallow groove wherein the groove depth is less than half the height of the rigid component.

49. The seal system of claim 34 wherein a trough of the load ring component forms a v-shape.

50. The seal system of claim 34 wherein a trough of the load ring component forms a generally v-shape with a concave bottom.

51. The seal system of claim 34 wherein a trough of the load ring component forms a half circle bottom.

52. The seal system of claim 34 wherein the load ring component is made of polyether ether ketone.

53. The seal system of claim 34 wherein the elastomeric component is placed within a trough formed on one side of the rigid component.

54. The seal system of claim 34 wherein the washer is made of ceramic.

55. The seal system of claim 54 wherein the ceramic is selected from the group consisting of cemented tungsten carbide, alumina, silicon carbide, silicone nitride, and polycrystalline diamond.

56. The seal system of claim 34 wherein the washer is made of a plastic material.

57. The seal system of claim 56 wherein the plastic material is selected from the group consisting of polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone.

58. The seal system of claim 34 wherein the washer is made of garolite.

59. The seal system of claim 34 wherein a connector provides electrical communication between the conductive core and the contact.

60. The seal system of claim 59 wherein the connector, the contact, and/or the conductive core 73 are coated with a corrosion resistant material.

61. The seal system of claim 60 wherein the corrosion resistant coating is selected from the group consisting of gold plating, gold cladding, and conductive noble metallic alloys.

62. The seal system of claim 59 wherein the connector, the contact, and/or the conductive core are made corrosion resistant by dipping or painting with conductive paints or liquid coatings having conductive properties.

63. The seal system of claim 59 wherein the connector, the contact, and/or the conductive core are coated with a liquid repelling insulating material.

64. The seal system of claim 63 wherein material is a grease, a gel, or a plastic.

* * * * *